(12) United States Patent
Dowling et al.

(10) Patent No.: US 6,289,023 B1
(45) Date of Patent: Sep. 11, 2001

(54) HARDWARE CHECKSUM ASSIST FOR NETWORK PROTOCOL STACKS

(75) Inventors: Brian M. Dowling, El Dorado Hills; Christian J. Warling, Rocklin; James G. Wendt, Auburn, all of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/937,912

(22) Filed: Sep. 25, 1997

(51) Int. Cl.[7] ................................................. H04L 12/28
(52) U.S. Cl. ............................................ 370/419; 370/473
(58) Field of Search ........................................ 370/310, 401, 370/467, 469, 471, 419, 420, 421, 473; 395/185.05, 200, 575; 371/53, 37.1; 714/48, 758, 799, 807

(56) References Cited

U.S. PATENT DOCUMENTS

| | | | |
|---|---|---|---|
| 5,430,842 | * 7/1995 | Thompson et al. | 395/200 |
| 5,491,802 | * 2/1996 | Thompson et al. | 395/200.18 |
| 5,500,864 | 3/1996 | Gonia et al. | 371/53 |
| 5,522,039 | 5/1996 | Snyder et al. | |
| 5,583,859 | * 12/1996 | Feidmeier | 370/471 |
| 5,805,818 | * 9/1998 | Perlman et al. | 395/200.54 |
| 5,815,516 | * 9/1998 | Aaker et al. | 371/53 |

FOREIGN PATENT DOCUMENTS

| | | | |
|---|---|---|---|
| 0 572 146 A2 | 12/1993 | (EP) | H04L/29/06 |
| 0 725 346 A1 | 8/1996 | (EP) | G06F/11/14 |
| WO 96/41424 | 12/1996 | (WO) | H30M/13/00 |

* cited by examiner

Primary Examiner—Chau Nguyen
Assistant Examiner—Alexander Boakye
(74) Attorney, Agent, or Firm—David A. Plettner

(57) ABSTRACT

A fly-by checksum is generated at a lower layer of the protocol stack and travels up to a high layer of a protocol stack to verify incoming data. In one embodiment, a network adapter comprises includes one or more protocol stacks and a LAN controller that includes a fly-by checksum generation unit. A checksum algorithm is registered with the fly-by checksum generation unit for each protocol layer that is to receive a fly-by checksum. As an incoming packet is transferred from network media to network adapter memory, the fly-by checksum generation unit calculates a fly-by checksum for each checksum algorithm that has been registered. After the fly-by checksums are complete, they are transmitted to the network adapter memory and are transmitted up the appropriate protocol stack within a checksum channel. When data reaches a layer of the protocol stack for which the fly-by checksum was generated, the fly-by checksum is removed from the checksum channel and is used to verify the integrity of the data.

19 Claims, 5 Drawing Sheets

HARDWARE CHECKSUM ASSIST FOR NETWORK PROTOCOL STACKS

FIELD OF THE INVENTION

The present invention relates to checksums that verify the integrity of data packets as the data packets flow though network protocol stacks. More specifically, the present invention uses hardware to generate a checksum that flows through the stack alongside the data packet, thereby allowing any particular layer of the protocol stack to access the checksum without incurring the time penalty associated with calculating the checksum after the packet arrives at the layer.

DESCRIPTION OF THE RELATED ART

In the art of computer networking, protocol stacks are commonly used to transmit data between network nodes that are coupled by network media. Network nodes include devices such as computer workstations, servers, network printers, network scanners, and the like. To harmonize the development and implementation of protocol stacks, the International Standards Organization (ISO) promulgated an Open System Interconnection (OSI) Reference Model that prescribes seven layers of network protocols.

FIG. 1 is a block diagram 10 of the OSI reference model. The model includes a hardware layer 12, a data link layer 14, a network layer 16, a transport layer 18, a session layer 20, a presentation layer 22, and an application layer 24. Each layer is responsible for performing a particular task. Hardware layer 12 is responsible for handling both the mechanical and electrical details of the physical transmission of a bit stream. Data link layer 14 is responsible for handling the packets, including any error detection and recovery that occurred in the physical layer. Network layer 16 is responsible for providing connections and routing packets in the communication network, including handling the address of outgoing packets, decoding the address of incoming packets, and maintaining routing information for proper response to changing loads. Transport layer 18 is responsible for low-level access to the network and the transfer of messages between the users, including partitioning messages into packets, maintaining packet order, flow control, and physical address generation. Session layer 20 is responsible for implementing the process-to-process protocols. Presentation layer 22 is responsible for resolving the differences in formats among the various sites in the network, including character conversions, and half duplex/full duplex (echoing). Finally, application layer 24 is responsible for interacting directly with the users. Layer 24 may include applications such as electronic mail, distributed data bases, web browsers, and the like.

Before the ISO promulgated the OSI reference model, the Defense Advanced Research Projects Agency (DARPA) promulgated the ARPNET reference model. The ARPNET reference model includes four layers, a network hardware layer, a network interface layer, a host-to-host layer, and a process/application layer.

As their names imply, the OSI reference model and the ARPNET reference model provide guidelines that designers of protocols may or may not chose to follow. However, most networking protocols define layers that at least loosely correspond to a reference model.

In the field of computing, there are many popular protocols used to transmit data between network nodes. For example, TCP/IP, AppleTalk®, NetBEUI, and IPX are all popular protocols that are used to transmit data between servers, workstations, printers, and other devices that are coupled to computer networks.

It is common for many of the protocols to operate concurrently within a single network node, even if the network node has a single network interface. For example, a typical computer workstation may use TCP/IP to communicate over the Internet, and IPX to communicate with a network server. Likewise, a printer may be configured to receive print jobs using either the AppleTalk® protocol or the NetBEUI protocol. Typically, a software routine existing at data link layer 14 or network layer 16 routes data packets between the network adapter and the proper protocol stack.

Various protocols also define methods to verify the integrity of data transmitted by the protocol. For example, consider a TCP/IP packet as it arrives at an Ethernet network adaptor. The entire Ethernet packet is protected by a cyclic redundancy check (CRC) code that is calculated and stuffed into the Ethernet packet by the sending network adapter, and is used by the receiving network adapter to verify the integrity of the Ethernet packet. If the integrity of the packet cannot be verified, the packet is discarded.

Encapsulated within the Ethernet packet is the IP portion of the TCP/IP protocol. The IP portion has a 16 bit checksum code that protects the IP header. If the integrity of the IP header cannot be verified, the packet is discarded. The TCP portion of the TCP/IP protocol is encapsulated within the IP portion, and has a 16 bit checksum code that protects the TCP header and the contents of the TCP portion of the packet. If the integrity of the TCP header or the contents of the TCP portion cannot be verified, the packet is discarded and the sender will retransmit the packet after not receiving an acknowledge packet from the intended recipient.

The integrity of the Ethernet packet is verified by the networking hardware at hardware layer 12, and therefore is performed quite quickly. However, the higher layers of the protocol stack are typically implemented by software. Calculating a checksum using a software routine is considerably slower. In the prior art, a checksum required by a higher layer of the protocol stack could not be generated at the hardware layer because the hardware layer did not have knowledge of the higher layers of the stack.

One prior art solution that speeds up the generation of a checksum at a higher layer of a protocol stack is to use a hardware checksumming facility that is controlled by the higher layer of the protocol stack. For example, when a TCP module seeks to verify the integrity of a TCP header and its respective data, the TCP module writes to a register of the hardware checksumming facility to begin the checksumming process, and polls the facility to determine when the checksum is complete. While such a solution is faster than a checksum generated solely by a software routine, there is still a significant delay while the checksum is generated.

Another method of calculating checksums using hardware was disclosed by Snyder et al. in U.S. Pat. No. 5,522,039, which is entitled "Calculation of Network Data Check Sums by Dedicated Hardware With Software Corrections." This patent discloses generating a "gross checksum" for the entire packet as the packet is transferred via a direct memory access (DMA) operation between adapter memory and system memory. Higher layers of the protocol stack then calculate the checksum required by calculating a checksum for the portions of the packet that are not needed, and then subtracting this checksum from the gross checksum to form a "net checksum", which is the checksum required by that layer of the protocol stack. Since the checksum for the portion is calculated over a relatively small number of bytes, the scheme disclosed by Snyder et al. incurs a smaller time penalty than other prior art methods.

SUMMARY OF THE INVENTION

The present invention provides a protocol stack layer with the ability to verify a data packet using a fly-by checksum that was generated at a lower layer of the protocol stack. In one embodiment, a network adapter includes one or more protocol stacks and a LAN controller that includes a fly-by checksum generation unit. In this embodiment, a checksum algorithm is registered with the fly-by checksum generation unit for each protocol layer that is to receive a fly-by checksum. The fly-by checksum generation is provided with the type of checksum algorithm to be executed, as well as beginning and ending byte positions that define the portion of the incoming packet to be checksummed. As an incoming packet is transferred from network media to network adapter memory via a DMA operation, the fly-by checksum generation unit calculates in parallel a fly-by checksum for each checksum algorithm that has been registered. The fly-by checksums are then transmitted up the appropriate protocol stack within a checksum channel, along with data from the incoming packet that was used to generate the fly-by checksum. When that data reaches a layer of the protocol stack for which the fly-by checksum was generated, the fly-by checksum is removed from the checksum channel and is used to verify the integrity of the data. By calculating checksums as packets are being received from network media, the present invention minimizes the delay incurred by verifying the integrity of data at higher layers of protocol stacks.

DETAILED DESCRIPTION OF THE PREFERRED EMBODIMENTS

Figure 1:
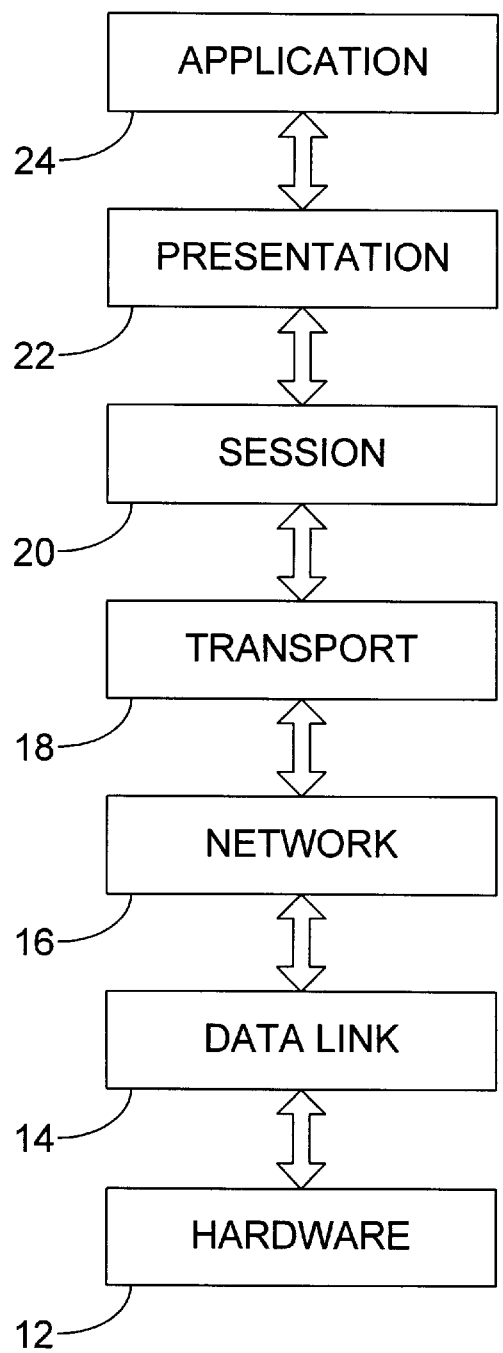
FIG. 1 is a block diagram of an Open System Interconnection (OSI) reference model.
Figure 2:
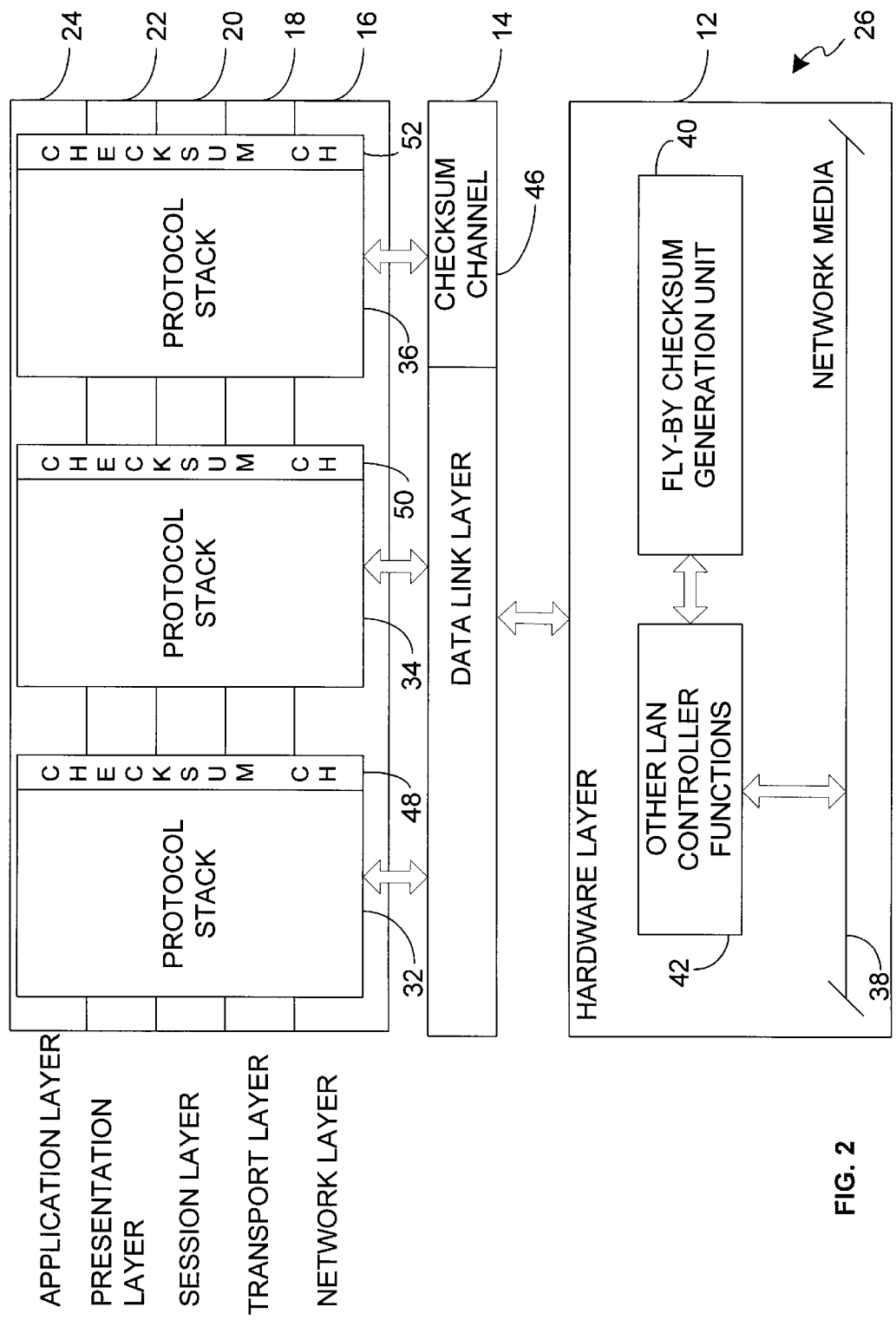
FIG. 2 shows a network node in accordance with the present invention.

The present invention allows checksums that are required by upper layers of a protocol stack to be generated by hardware at a lower layer of the protocol stack. Such checksums will be referred to herein as "fly-by" checksums. FIG. 2 shows a network node 26 in accordance with the present invention and adhering to the Open System Interconnection (OSI) Reference Model promulgated by the International Standards Organization (ISO). Similar to the OSI reference model shown in FIG. 1, node 26 also includes a hardware layer 12, a data link layer 14, a network layer 16, a transport layer 18, a session layer 20, a presentation layer 22, and an application layer 24. Protocol stacks 32, 34, and 36 are symbolically shown existing within network layer 16, transport layer 18, session layer 20, presentation layer 22, and application layer 24. However, those skilled in the art will recognize that the degree to which any network protocol confirms to the OSI reference model varies.

Hardware layer 12 includes a local area network (LAN) controller that is coupled to network media 38, which in turn is coupled to other network nodes. Within hardware layer 12, fly-by checksum generation unit 40 generates fly-by checksums that are used by one or more of the layers of the protocol stacks. Block 42 represents other LAN controller functions, which will be explained in greater detail below with reference to FIG. 3.

In a typical protocol stack of the prior art, generally a particular layer of the protocol stack is only aware of adjacent layers. Accordingly, with reference to FIG. 1, hardware layer 12 has no knowledge of transport layer 18. Therefore, hardware layer 12 is not able to generate a checksum for transport layer 18, even though layer 12 can potentially generate such a checksum more efficiently.

In the present invention, when a layer of a protocol stack is initialized, a checksum algorithm can be registered with fly-by checksum generation unit 40. The algorithm can be registered by the operating system or by the respective layer of the protocol stack. The information provided to unit 40 when the checksum algorithm is registered includes the type of checksum algorithm, and the beginning and ending byte positions of the data packet. The beginning and ending byte positions denote the portion of the data packet that should be included in the checksum. After one or more checksum algorithms have been registered with unit 40, a fly-by checksum is generated in parallel for each algorithm when a data packet is transmitted to data link layer 30.

Data link layer 30 includes checksum channel 4, and protocol stacks 32, 34, and 36 include checksums channels 48, 50, and 52, respectively. As used herein, the term "checksum channel" is used to collectively refer to various data structures required to relay checksums up a protocol stack alongside the respective data associated with the checksum. Those skilled in the art will recognize that a checksum channel may be implemented using a variety of methods, such as a declaration reserving room in the data structure in which is stored the respective data packet or defining a separate data structure and using links to associate a checksum to a data packet.

Since different layers of the protocol stacks have little or no knowledge of the other layers, fly-by checksums generated by fly-by checksum generation unit 40 are simply propagated up through the checksum channels. When a particular layer receives a packet, and that layer requires a checksum to verify the integrity of the packet and the required checksum algorithm has been registered with unit 40, the layer simply reads the checksum from the checksum channel.

For example, assume that protocol stack 32 implements the TCP/IP protocol, and protocol stack 34 implements the IPX protocol. When the TCP layer is initialized, the TCP layer notifies fly-by checksum generation unit 40 that it requires a checksum formed from a 16 bit one's complement on the one's complement sum of all 16 bit words in the TCP header and contents, which is the checksum algorithm defined by the TCP/IP protocol. It also tells unit 40 the beginning and ending byte positions of the Ethernet packet upon which the checksum should be generated. Unit 40 responds by confirming that the checksum algorithm has been registered, and notifying the TCP layer that the proper checksum will be the first checksum in the checksum channel.

When the IPX layer is initialized, the IPX layer also notifies unit 40 of the checksum algorithm that it requires, and the beginning and ending byte positions of the Ethernet packet upon which the checksum should be generated. Unit 40 responds by confirming that the checksum algorithm has been registered, and notifying the IPX layer that the proper checksum will be the second checksum in the checksum channel.

When an incoming packet is received by a network adapter 28, unit 40 generates a checksum based on that packet for each checksum algorithm that has been registered. Adapter 28 typically does not know which protocols may be contained in the packet.

While data link layer 30 is aware of the bottom layer of each protocol stack, and is able to direct the packet to the proper stack, layer 30 does not know which layer has registered a particular checksum algorithm. Accordingly, data link layer 30 routes all fly-by checksums up through the checksum channel of the appropriate protocol stack.

The fly-by checksums continue up the checksum channel associated with a protocol stack until they arrive at the layer that registered the checksum algorithm. For example, if protocol stack 32 implements the TCP/IP protocol, as discussed above, then the TCP layer will retrieve the first checksum from the checksum channel, if protocol stack 34 implements the IPX protocol, then the IPX layer will retrieve the second checksum from the checksum channel, and so on. Although it is anticipated that the present invention will be most beneficial when used to generate fly-by checksums for the upper layers of protocol stacks, the present invention is broad enough to encompass an application registering a checksum algorithm with fly-by checksum generation unit 40, and then using a fly-by checksum calculated in accordance with the registered checksum algorithm at the application layer.

In many network applications, a network adapter includes one or more protocol stacks, and passes data to a host system after processing by a protocol stack. For example, Hewlett-Packard's line of JetDirect network adapters receive data from a network, process the data through a protocol stack, and then transmit the data to a printer. When the data is transmitted to the printer, the data has been stripped of all network protocols, and is similar in format to data transmitted to a printer via a parallel port. In such a network adapter, an incoming packet is received by a transceiver, and then stored in memory provided by the adapter. The packet is then processed by the protocol stack and the resulting data is passed to the host system.

Many vendors provide application specific integrated circuits (ASICs) that include LAN controller core circuitry along with definable logic that is used by the designer of a network adapter to implement various functions. It is desirable to squeeze as much functionality as possible into such an ASIC to minimize the circuitry required outside the ASIC, thereby minimizing the cost of the network adapter. However, such ASICs typically do not have enough definable logic to allow for storage of whole packets within the ASIC. Accordingly, it is not practical to receive a packet within the ASIC, and then accumulate a checksum as the packet is DMA'ed out of the ASIC and into adapter memory.

Figure 3:
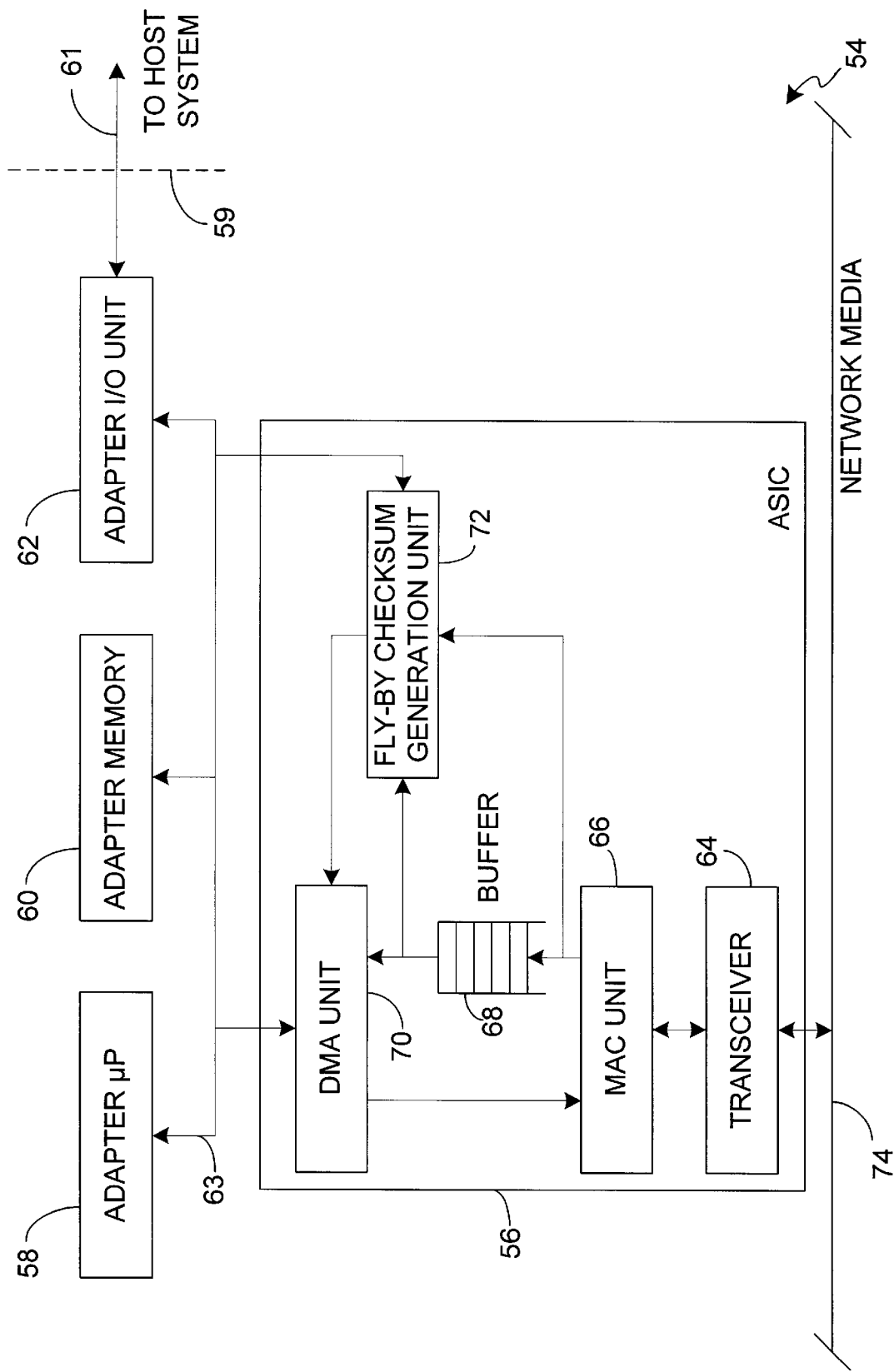
FIG. 3 is a block diagram showing a network adapter in accordance with the present invention.

The present invention allows for a checksum to be accumulated within the ASIC while a data packet is simultaneously being received by the ASIC and DMA'ed out of the ASIC and into adapter memory. FIG. 3 is a block diagram of network adapter 54, which is an embodiment of the present invention. Network adapter 54 includes ASIC 56, adapter microprocessor 58, adapter memory 60, and adapter input/output (I/O) unit 62, all of which are coupled together by adapter bus 63. Adapter I/O unit is also coupled to a host system, such as a printer or a computer network, via system bus 61, with dotted line 59 representing the system bus interface. ASIC 56 includes transceiver 64, media access control (MAC) unit 66, byte buffer 68, DMA unit 70, and fly-by checksum generation unit 72. Transceiver 64 is coupled to network media 74 and MAC unit 66. MAC unit 66 is also coupled to an input of byte buffer 68, DMA unit 70, and fly-by checksum generation unit 72. An output of byte buffer 68 is coupled to DMA unit 70 and fly-by checksum generation unit 72. DMA unit 70 and fly-by checksum generation unit 72 are each coupled to adapter bus 63, and fly-by checksum generation unit 72 is coupled to DMA unit 70.

Adapter microprocessor unit 58 is a microprocessor that executes code which controls various functions of network adapter 54 and implements the protocol stacks. Adapter memory unit 60 represents both read-only memory (ROM) and random access memory (RAM). The ROM contains program code that is executed by microprocessor unit 58, and the RAM is used to buffer incoming and outgoing packets and store other data, and may also contain program code. Adapter I/O unit 62 provides a communication link between network adapter 54 and a host system via system bus 61.

When an incoming packet begins to arrive at network adapter 54, transceiver 64 receives packet bytes that form the incoming packet. As the packet bytes are received, they flow through MAC unit 66 and to the input of byte buffer 68. The input of byte buffer 68 is also provided to fly-by checksum generation unit 72 to facilitate the generation of an "end-of-packet" signal, which will be described in greater detail below.

As the packet bytes emerge from the output of byte buffer 68, they are provided to DMA unit 70 and fly-by checksum generation unit 72. DMA unit 70 transfers the packet bytes to adapter memory 60. While DMA unit 70 is transmitting the packet bytes, fly-by checksum generation unit 72 calculates checksums for checksum algorithms that have been registered. After the checksums are complete, they are transferred to adapter memory 60 via DMA unit 70.

Once the packet is stored in memory 60 along with any checksums that were calculated, adapter microprocessor 58 executes code that performs processing required by the protocol stacks, as discussed above with reference to FIG. 2.

Figure 4:
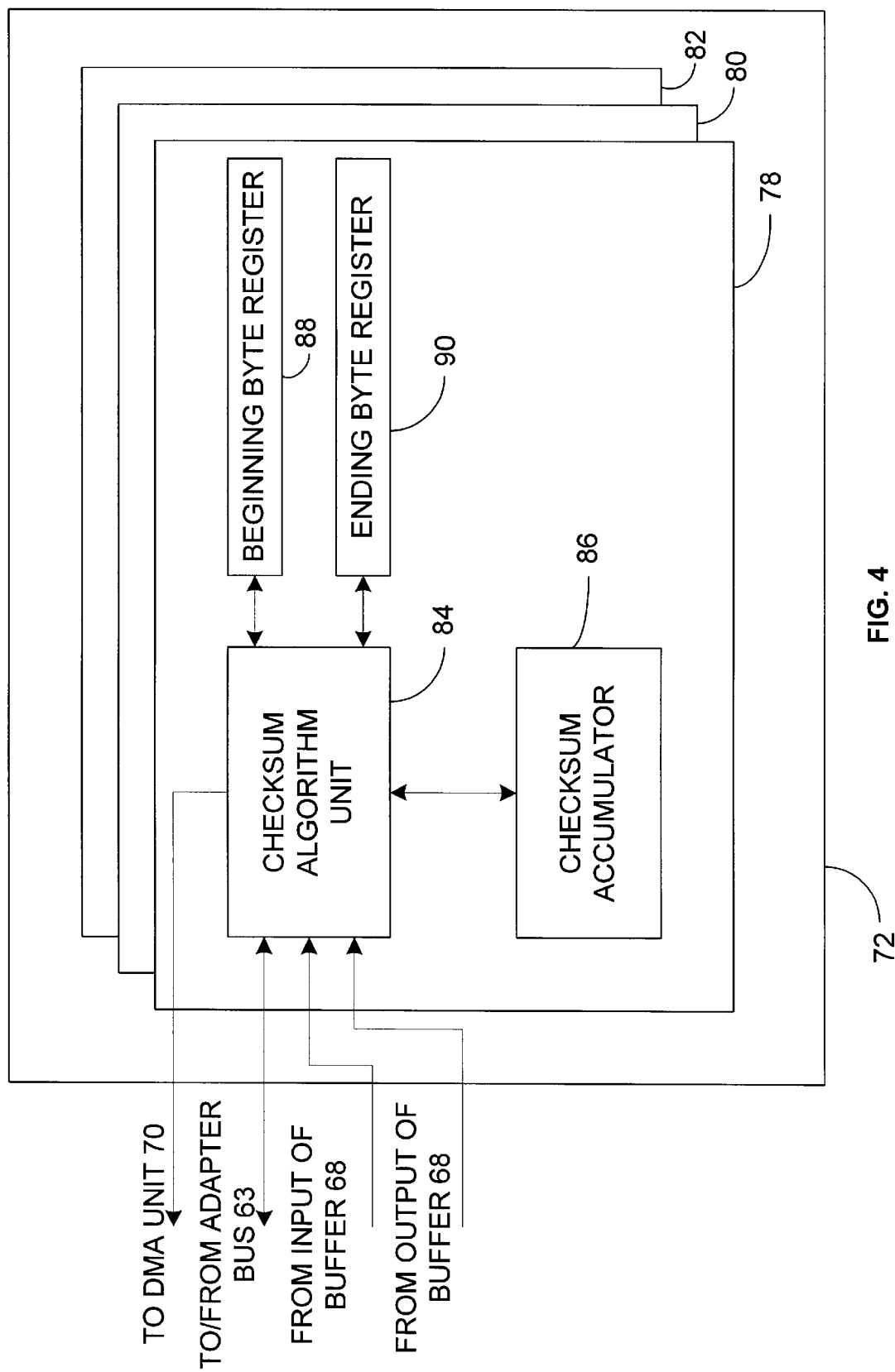
FIG. 4 is a block diagram of a fly-by checksum generation unit shown in FIG. 3.

FIG. 4 is a block diagram of fly-by checksum generation unit 72 of FIG. 3. Unit 72 includes checksum modules 78, 80, and 82. A checksum module is required for each checksum algorithm that is to be implemented by unit 72. Each checksum module includes checksum algorithm unit 84, checksum accumulator 86, beginning byte register 88, and ending byte register 90. Registers 88 and 90 and accumulator 86 are each coupled to checksum algorithm unit 84, and checksum algorithm 84 is coupled to adapter DMA unit 70, adapter bus 63, and the input and output of buffer 68.

Checksum algorithm unit 84 stores the checksum algorithm that is used to generate fly-by checksums as packet bytes are transferred from network media 74 to adapter memory 60 via transceiver 64, MAC unit 66, buffer 68, and DMA unit 70. In one embodiment, unit 72 includes one or more predefined checksum algorithms. Note that different protocols may use the same checksum protocol, even though the byte range to be checksummed in the packet is different. In another embodiment, checksum algorithm unit 72 includes programmable memory that may be programmed via adapter I/O unit 62 over adapter bus 63. Beginning byte register 88 stores the position number of the first byte of the packet to be included in the checksum, and ending byte register 90 stores the position number of the last byte to be included in the checksum. The number of the first byte is stored as an offset from the beginning of the packet and the number of the last byte is stored as an offset from the end of the packet. Since an offset from the end of the packet cannot be determined until the end of the packet has been received, the minimum number of entries provided in buffer 68 is based on the largest offset from the end of the packet that will be stored in ending byte register 90.

Figure 5:
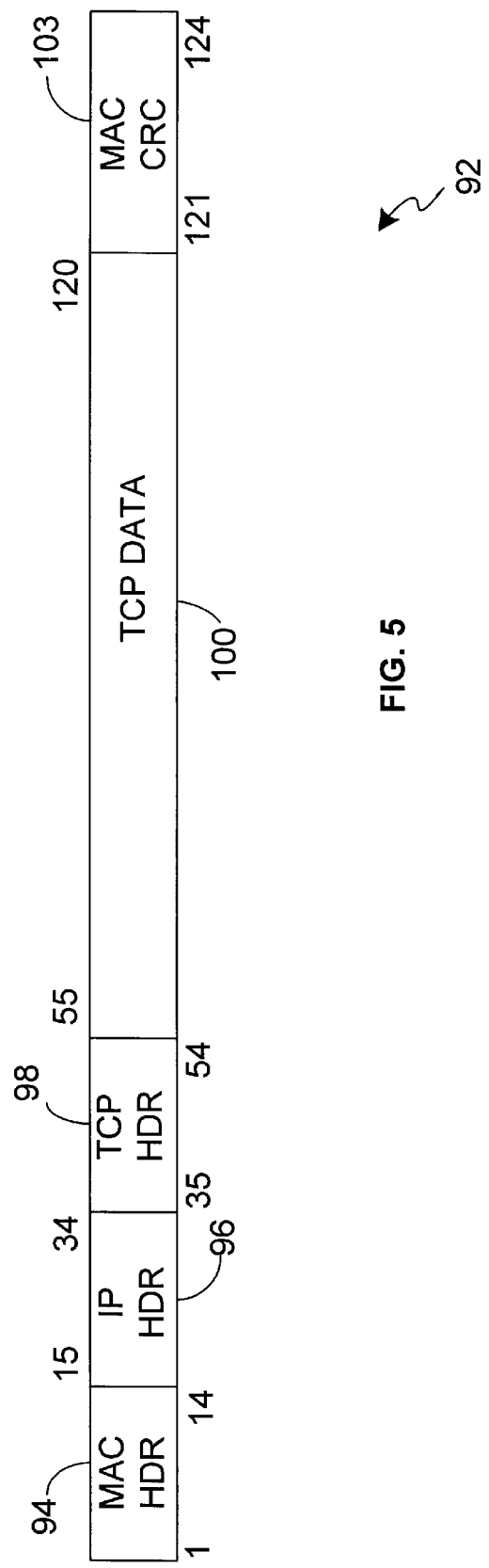
FIG. 5 shows a packet that includes data encoded using the TCP/IP protocol.

By way of example, consider an incoming Ethernet packet which includes data encoded using the TCP/IP protocol, such as packet 92 in FIG. 5. The TCP/IP protocol defines the checksum as follows:

The checksum is a 16 bit one's complement of the one's complement sum of all 16 bit words in the header and text. If a segment contains an odd number of header and text octets to be checksummed, the last octet is padded on the right with zeros to form a 16 bit word for checksum purposes. The pad is not transmitted as part of the segment. While computing the checksum, the checksum field itself is replaced with zeros.

Checksum algorithm unit 84 is configured to implement this algorithm, either by selecting a predefined algorithm present in unit 72 or by storing the algorithm in unit 72.

As seen in FIG. 5, the Ethernet packet 92 is 124 bytes long. Bytes 1–14 hold Ethernet MAC header 94, bytes 15–34 hold IP header 96, bytes 35–54 hold TCP header 98, bytes 55–120 hold TCP data portion 100, and bytes 121–1124 hold MAC CRC code 103. Since the TCP checksum includes TCP header 98, beginning byte register 88 is set to 35, and ending bit register 90 is set to 4 (which is an offset from the end of the packet).

As packet bytes forming Ethernet packet 92 begin to be transferred from MAC unit 66 to DMA unit 70 via buffer 68, the packet bytes appearing at the output of buffer 68 are also provided to checksum algorithm unit 84. When the byte position stored in beginning byte register 88 is reached, checksum algorithm unit 84 starts accumulating the checksum in checksum accumulator 86. When the last packet byte of the packet is transmitted to the input of buffer 68, unit 84 generates an "end-of-packet" signal. Based on the end-of-packet signal, the byte position stored in ending byte register 90, and the number of entries in buffer 68, unit 84 stops accumulating the checksum and does any post processing of the checksum in accumulator 86, such as padding last octet on the right with zeros to form a 16 bit word for checksum purposes if TCP header 98 and TCP data portion 100, taken together, contain an odd number octets to be checksummed, as required by the TCP/IP protocol. After the checksum is complete, it is transferred to DMA unit 70 and then adapter memory 60. With reference to FIG. 2, the checksum is then transferred to checksum channel 46 of data link layer 30, and then up through the checksum channel of the TCP/IP protocol.

Different types of protocol headers may have different lengths, so the checksum generated may or may not accurately reflect the contents of the packet. However, the protocol layer that registered the checksum algorithm will be able to determine whether it can use the fly-by checksum calculated by fly-by checksum generation unit 72, since that protocol layer will recognize whether the particular header corresponds to the type of header for which a checksum algorithm has been registered. In a typical protocol dialog, the majority of packets will carry user information (such as a print job), and those packets will have a predictable format and the beginning and ending bytes will be known. If a protocol transferred large amounts of data using two or more formats, than a checksum algorithm can be register for each format and the appropriate protocol layer would know which checksum to select based on the format of the header.

In another configuration, the present invention can be modified to also send the beginning and ending byte positions up the checksum channel along with the checksum. In addition, it may be desirable to also send an indication of the checksum algorithm up the checksum channel. Of course, if the a particular protocol level registered a checksum algorithm, that protocol level would know this information. However, it may be desirable to have an operating system register one or more checksum protocols, and then send the beginning and ending byte positions and the checksum indicator up the checksum channel along with the checksum. In such a configuration, the particular protocol level can monitor the checksum channel, and use a fly-by checksum in the channel if a valid checksum is available, or calculate a checksum using other methods if a fly-by checksum is not available.

The present invention is particularly well suited to network nodes that receive a large amount of incoming network packets, such as a printer that receives print jobs over a network or a network computer that loads executable programs over a network. It has been found that the present invention increases throughput in such network nodes approximately 10%–20%.

The present invention requires only minor alterations to prior art networking protocols. The protocols and/or operating system of the host system needs to initialize fly-by checksum unit 72 to perform the desired checksum algorithm, and each layer of the protocol that uses the fly-by checksum must pass the fly-by checksum up the stack, which can by easily done by passing a pointer to the fly-by checksum or by defining space in the data structure that stores the data packet associated with the checksum. Note that the highest layer that uses the fly-by checksum need not pass the checksum to higher layers. Finally, each layer that uses the fly-by checksum must recognize a packet for which a fly-by checksum is available, and be able to obtain that checksum from the checksum channel.

In a simple embodiment in which a checksum is only generated for one layer of one protocol, fly-by checksum generation unit 72 may be configured to generate a single checksum having predefined beginning and ending byte positions, thereby eliminating the need to register a checksum algorithm. Also, in a typical Ethernet packet containing data encoded with the TCP/IP protocol, the last four bytes of the packet will always contain the MAC CRC code. Since this code is only four bytes long, it is not a computationally intensive task to calculate the checksum of the MAC CRC code, and subtract this checksum from the fly-by checksum. By doing so, buffer 68 of FIG. 3 and ending byte register 90 of FIG. 4 are not needed, thereby minimizing the amount of logic required to implement the present invention.

Another advantage of the present invention is that it is completely backward-compatible with protocol stacks that do not support fly-by checksums, such as legacy protocols or protocols that are seldom used. Such protocols can simply calculate checksums using prior art methods.

Those skilled in the art will recognize that the present invention is not limited to checksum algorithms. For example checksum algorithm unit 84 of FIG. 4 may be programmed to generate an error correcting code that is passed up the protocol stack. Alternatively, checksum algorithm unit 84 may be programed to execute a decryption algorithm that decrypts a portion of an incoming packet using a decryption key provided by the host system. The decrypted portion of the packet can then be passed up the protocol stack using a "decrypted channel", similar to the checksum channel described above.

Although the present invention has been described with reference to a network adapter that includes protocol stacks, such as a network adapter used with a printer, those skilled in the art will also recognize that the teachings contained herein may also be applied to a system in which the protocol stacks are implemented by the host system. For example, in another embodiment of the present invention, a network adapter having a fly-by checksum generation unit in accordance with the present invention may be inserted into a PCI slot of a computer workstation, with the protocol stacks implemented as software routines that execute on the workstation. In such an embodiment, a particular layer of a protocol stack registers a checksum algorithm with the fly-by checksum generation unit via the adapter I/O unit, which is coupled to the PCI bus. Whether the incoming packet bytes are DMA'ed first to adapter memory or are DMA'ed directly to system memory of the workstation, fly-by checksums are generated substantially as described above.

The advantages of the present invention are achieved because the data is being checksummed (or otherwise processed as discussed above) as the data is being received from the network media and DMA'ed into memory. Since the data is being moved anyway, little additional penalty is incurred by calculating the checksum. Additional benefit is derived from the fact that the data is being checksummed in the LAN controller ASIC, where it is easy for a designer to add hardware capable of performing the checksum.

Although the present invention has been described with reference to preferred embodiments, workers skilled in the art will recognize that changes may be made in form and detail without departing from the spirit and scope of the invention.

What is claimed is:

1. A method of receiving data at a network node that includes a network adapter and a protocol stack having a plurality of layers, the method comprising:
   receiving packet bytes at a transceiver coupled to the network media;
   transferring packet bytes from the transceiver to a direct memory access unit;
   transferring packet bytes from the direct memory access unit to adapter memory;
   calculating a code from packet bytes that form a portion of the incoming data packet as the packet bytes are transferred from network media to memory;
   transferring the code to a code channel associated with the protocol stack;
   receiving data extracted from the data packet at a first layer of the plurality of layers of the protocol stack; and
   verifying the extracted data using the code from the code channel.

2. The method of claim 1 wherein the code is a checksum code.

3. The method of claim 1 wherein the protocol stack is a TCP/IP stack.

4. A method of receiving data at a network node that includes a network adapter and a protocol stack having a plurality of layers, the method comprising:
   transferring packet bytes that form an incoming data packet from network media to memory;
   counting packet bytes of the incoming packet;
   accumulating a code based on packet bytes identified by a beginning byte position;
   terminating accumulating the coded;
   transferring the code to a code channel associated with the protocol stack;
   receiving data extracted from the data packet at a first layer of the plurality of layers of the protocol stack; and
   verifying the extracted data using the code from the code channel.

5. The method of claim 4 wherein terminating accumulating the code comprises:
   terminating accumulating the code based on an ending byte position.

6. The method of claim 4 wherein tempting accumulating the code includes performing any post processing necessary to complete the code.

7. A method of receiving data at a network node that includes a network adapter and a protocol stack having a plurality of layers, the method comprising:
   registering a checksum algorithm;
   transferring packet bytes that form an incoming data packet from network media to memory;
   calculating a code from packet bytes that form a portion of the incoming data packet as the packet bytes are transferred from network media to memory;
   transferring the code to a code channel associated with the protocol stack;
   receiving data extracted from the data packet at a first layer of the plurality of layers of the protocol stack; and
   verifying the extracted data using the code from the code channel.

8. The method of claim 7 wherein registering a checksum algorithm includes specifying beginning and ending byte positions.

9. The method of claim 7 wherein calculating a code from packet bytes comprises:
   calculating a code for each checksum algorithm registered from packet bytes that form a portion of the incoming data packet as the packet bytes are transferred from network media to memory.

10. A network node comprising:
    a protocol stack;
    a memory unit;
    a transceiver coupled capable of being coupled to network media;
    a memory access unit coupled between the transceiver and the memory unit, for transferring bytes that form an incoming packet from network media to the main memory unit;
    an algorithm execution unit, for executing an algorithm to calculate a code from bytes that form a portion of the incoming packet as the bytes are transferred from network media to the maim memory unit; and
    a code channel associated with the protocol stack, for receiving the code from the algorithm execution unit and transferring the code up the protocol stack along with data from a received packet.

11. The network node of claim 10 wherein the algorithm execution unit counts bytes of the incoming packet and accumulates the code based on bytes identified by a beginning byte position.

12. The network node of claim 11 wherein the beginning byte position is stored in a beginning byte register.

13. The network node of claim 11 wherein the algorithm execution unit terminates accumulating the code based on a byte identified by an ending byte position.

14. The network node of claim 13 wherein the ending byte position is stored in an ending byte register.

15. The network node of claim 13 the algorithm execution unit performs any post processing necessary to complete the code.

16. The network node of claim 10 wherein the code is a checksum code.

17. The network node of claim 10 wherein the protocol stack is a TCP/IP stack.

18. The network node of claim 10 wherein the algorithm execution unit accepts requests to register algorithms, and calculates a code for each registered algorithm.

19. The network node of claim 18 wherein a request to register an algorithm includes beginning and ending byte positions.

* * * * *

UNITED STATES PATENT AND TRADEMARK OFFICE
CERTIFICATE OF CORRECTION

PATENT NO. : 6,289,023 B1
DATED : September 11, 2001
INVENTOR(S) : Brian M. Dowling et al.

It is certified that error appears in the above-identified patent and that said Letters Patent is hereby corrected as shown below:

Column 3,
Line 8, after "generation unit." begin a new paragraph
Line 18, after "been registered." begin a new paragraph Column 5,
Line 63, after "interface." begin a new paragraph Column 10,
Line 7, delete "tempting" and insert therefor-- terminating --

Signed and Sealed this

Twenty-second Day of June, 2004

JON W. DUDAS
*Acting Director of the United States Patent and Trademark Office*